(12) United States Patent
Walker

(10) Patent No.: US 9,952,858 B2
(45) Date of Patent: *Apr. 24, 2018

(54) COMPUTER READABLE STORAGE MEDIA AND METHODS FOR INVOKING AN ACTION DIRECTLY FROM A SCANNED CODE

(71) Applicant: Quikkly Limited, Windsor, CA (US)

(72) Inventor: Fergal Walker, Sollentuna (SE)

(73) Assignee: Quikkly Limited, Windsor (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,002

(22) Filed: Feb. 7, 2017

(65) Prior Publication Data

US 2017/0147339 A1 May 25, 2017

Related U.S. Application Data

(63) Continuation of application No. 14/678,885, filed on Apr. 3, 2015, now Pat. No. 9,594,555.

(60) Provisional application No. 61/976,385, filed on Apr. 7, 2014.

(51) Int. Cl.
  *G06F 17/30* (2006.01)
  *G06F 9/30* (2018.01)
  *G06K 7/14* (2006.01)
  *G06K 9/20* (2006.01)
  *G06K 19/06* (2006.01)
  *G06F 9/44* (2018.01)

(52) U.S. Cl.
  CPC .................. *G06F 9/30* (2013.01); *G06F 9/44* (2013.01); *G06K 7/1417* (2013.01); *G06K 9/2054* (2013.01); *G06K 19/06103* (2013.01)

(58) Field of Classification Search
  CPC .................................................... G06K 7/1404
  See application file for complete search history.

(56) References Cited

U.S. PATENT DOCUMENTS

| | | | |
|---|---|---|---|
| 7,069,113 B2 | 6/2006 | Matsuoka | |
| 7,509,569 B2 | 3/2009 | Barrus | |
| 9,077,828 B1 | 7/2015 | Koster | |
| 9,111,164 B1 | 8/2015 | Anderton et al. | |
| 9,594,555 B2 * | 3/2017 | Walker | G06F 17/30879 |
| 2001/0000086 A1 | 4/2001 | Lewis | |

(Continued)

OTHER PUBLICATIONS

"QR Code Monkey", available online at "http://web.archived.orglweb/20121001044542/http://www.qrcode-monkey.com/", retrieved on Apr. 12, 2017, 2 pages.

(Continued)

*Primary Examiner* — Christle I Marshall
(74) *Attorney, Agent, or Firm* — Dergosits & Noah LLP

(57) ABSTRACT

Systems and methods for performing functions are disclosed herein. An example non-transitory computer-readable storage medium may store one or more programs, and the one or more programs may comprise instructions which, when executed by one or more processors of a computing device, cause the computing device to obtain a scanned code, analyze the scanned code to identify a direct action associated with the scanned code, and automatically invoke the one or more functions corresponding to the direct action. The direct action may include sending instructions or data or both to another computing device.

40 Claims, 8 Drawing Sheets

(56) References Cited

U.S. PATENT DOCUMENTS

2016/0203586 A1  7/2016 Chang et al.
2017/0019446 A1  1/2017 Son et al.

OTHER PUBLICATIONS

International Search report and Written Opinion received from PCT Patent Application No. PCT/EP2015/057482, dated Jun. 19, 2015, 8 pages.
"Snapchat Spent $51 Million on the Company Behind Its Cool New QR Codes", avilable online at "http://www.businessinsider.com/snapchat-qr-codes-scanme-2015-1", retrieved Apr. 12, 2017, 2 pages.

* cited by examiner

COMPUTER READABLE STORAGE MEDIA AND METHODS FOR INVOKING AN ACTION DIRECTLY FROM A SCANNED CODE

CROSS-REFERENCE TO RELATED APPLICATIONS

This application is a continuation of U.S. patent application Ser. No. 14/678,885, entitled "COMPUTER READABLE STORAGE MEDIA FOR INVOKING DIRECT ACTIONS AND PROCESSES AND SYSTEMS UTILIZING SAME," filed on Apr. 3, 2015, which claims priority to U.S. Provisional Patent Application No. 61/976,385, entitled "QUICK ACCESS CODE SYSTEM," filed Apr. 7, 2014. The contents of each of these applications are hereby incorporated by reference in their entirety.

BACKGROUND

1. Field

The present disclosure relates generally to the field of codes and, more particularly, to quick access codes.

2. Related Art

While machine-readable codes, (e.g., quick response codes), were originally developed for industrial uses, such as managing production lines and stock management, such codes have more recently been adopted in other industries as well. By way of example, these codes have been used for marketing purposes in circumstances where an end user scans a code using a device and is presented with a website from which functions associated with that website may thereafter be accessed. In many instances the end user does not know the purpose for a code until the code is scanned. Moreover, once published, codes are difficult to reassign functionally and track analytically.

Augmented reality, on the other hand, is directed to a technology where a camera is pointed at a scene or graphic and an augmented experience of the scene appears on a screen. Support for augmented reality is not widely adopted and it is often unclear to end users which scenes or images can be augmented.

Accordingly, neither machine-readable codes nor augmented reality presents a tenable solution for intuitively specifying functions associated with scanning codes and images.

BRIEF SUMMARY

In accordance with some embodiments, a non-transitory computer-readable storage medium storing one or more programs comprising instructions is disclosed. The instructions, when executed by one or more processors of a computing device, cause the computing device to obtain a scanned code; analyze the scanned code to identify a direct action associated with the scanned code, wherein the direct action results in sending instructions or data or both to another computing device; and automatically invoke the direct action.

In accordance with some embodiments, a method is disclosed. The method includes obtaining, with an electronic device, a scanned code; analyzing, with the electronic device, the scanned code to identify a direct action associated with the scanned code, wherein the direct action corresponds to one or more functions on the device or on another device; and automatically invoking the one or more functions corresponding to the direct action.

In accordance with some embodiments, a system is disclosed. The system includes a memory and at least one processing unit coupled to the memory. The memory is encoded with executable instructions that when executed cause the at least one processing unit to obtain a scanned code; analyze the scanned code to identify a direct action associated with the scanned code, wherein the direct action corresponds to one or more functions on the device or on another device; and automatically invoke the one or more functions corresponding to the direct action.

DETAILED DESCRIPTION

Systems and processes for invoking direct actions are disclosed herein. In accordance with one or more embodiments of the present invention, an electronic device may obtain a scanned code, such as a quick access code (QAC), to identify and invoke a direct action associated with the code. In some examples, the electronic device may invoke the direct action automatically. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination thereof. Although the processes are described below in terms of one or more sequential operations, it should be appreciated that some of the operations described may be performed in a different order, in combination with additional operations, or in combination with fewer operations. Moreover, in some examples, some operations may be performed in parallel rather than sequentially.

Figure 1:
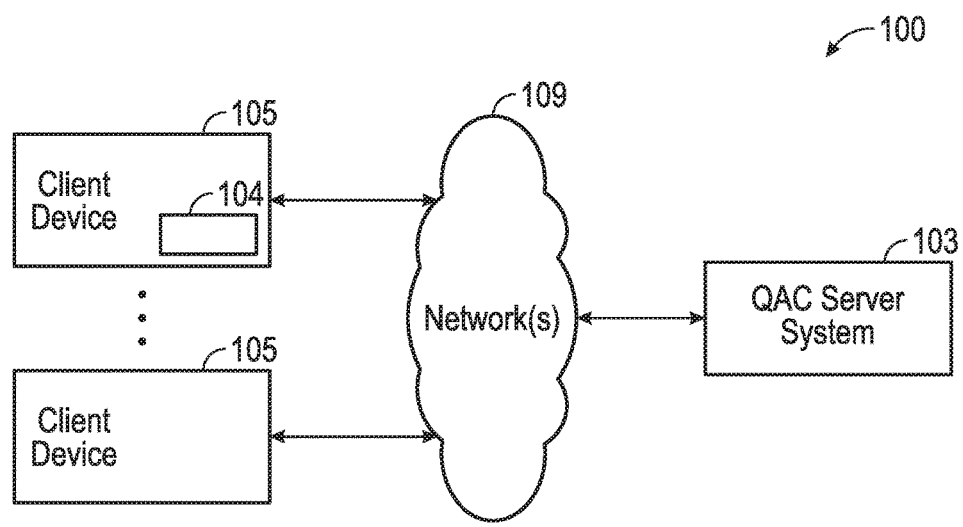
FIG. 1 is a schematic block diagram of a quick access code (QAC) system according to an embodiment of the present invention.

FIG. 1 is a schematic block diagram of a quick access code (QAC) system 100 according to an embodiment of the present invention. Each client device 105 of the QAC system 100 may comprise a computing device, including but not limited to a modem, a router, a gateway, a server, a thin client, a laptop, a desktop, a computer, a tablet, a media device, a smart phone, a cellular phone or other mobile device, a scanner (e.g., a point-of-sale scanner), or any combination or sub-combination of the same. Each client device 105 may include a memory (not shown in FIG. 1) encoded with executable instructions that may operate with one or more processing units (not shown in FIG. 1) of the client device 105. The one or more processing units may provide functionality allowing execution of executable instructions encoded on the memory of the client device 105. Each client device 105 may include instructions for one or more applications, such as a scan application 104, operation of which is described further below. An application executed by a client device 105 may be an application configured for one or more mobile devices, a web browser, or any other type of application known in the art, now or in the future.

Each client device 105 may be configured to communicate over a network 109 with any number of devices, including but not limited to, one more devices of the code scanning system 101. The network 109 may comprise one or more networks, such as local area networks (LANs), wide area networks (WANs), metropolitan area networks (MANs), cellular networks, and/or the Internet. Communications provided to, from, and within the network 109 may wired and/or wireless, and further may be provided using any networking devices known in the art, now or in the future. Devices communicating over the network 109 may communicate with any communication protocol, including TCP/IP and UDP protocols. Moreover, client devices 105 may be configured to communicate using known protocols, such as HTTP, HTTPS, SSL, or any protocol derived therefrom.

Each client device 105 may communicate through the network 109 to a QAC server system 103. The QAC server system 103 may be a general purpose computer system, a special purpose computer system and/or any other type of data processing system (such as the system shown in FIG. 9) which can be configured to provide one or more code services, for instance, to one or more client devices 105. By way of example, the QAC server system 103 can be configured to execute instructions that cause the QAC server system 103 to provide code services to client devices 105.

Figure 2:
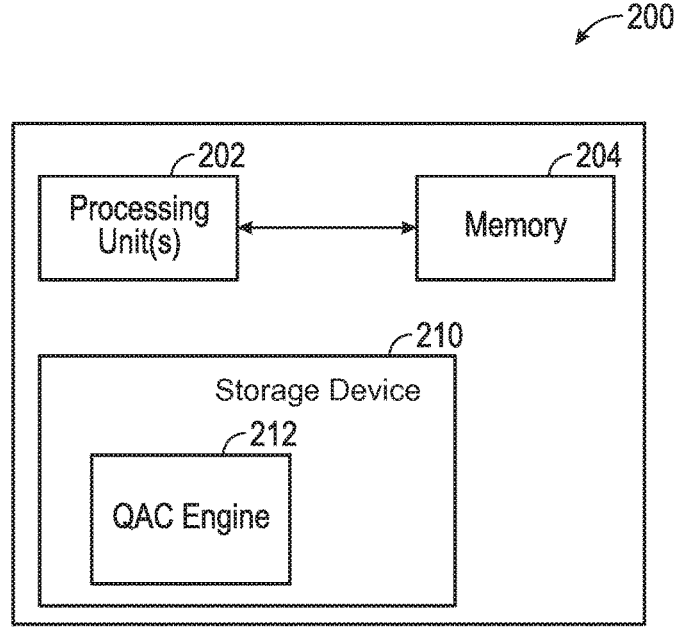
FIG. 2 is a block diagram of a QAC server according to an embodiment of the present invention.

With reference to FIG. 2, the QAC server system 103 may be implemented using the QAC server system 200 in some examples. The QAC server system 200 may include one or more processing units 202, a memory 204, and a storage device 210. In turn, the storage device 210 may include a QAC engine 212. References made herein to the QAC engine 212 may refer to the executable instructions for the QAC engine 212 being executed by one or more processing units 202, or by any other processing units. Herein, the term computer readable media is used to refer to a single computer readable medium in some embodiments, and in other embodiments, a plurality of computer readable media. Accordingly, storage device 210 may include any number of and/or formats of computer readable media. By way of example, storage device 210 may include any non-transitory computer readable storage or computer readable memory, including but not limited to, externally or internally attached hard disk drives, solid-state storage (such as NAND flash, NOR flash, or PCM media), tiered storage solutions, storage area networks, network attached storage, and/or optical storage. In some examples, the storage device 210 may include one or more database systems for storing data using one or more predefined structures. Databases of the storage device 210 may be scalable and/or distributed among any number of computer-readable media and locations.

Figure 7:
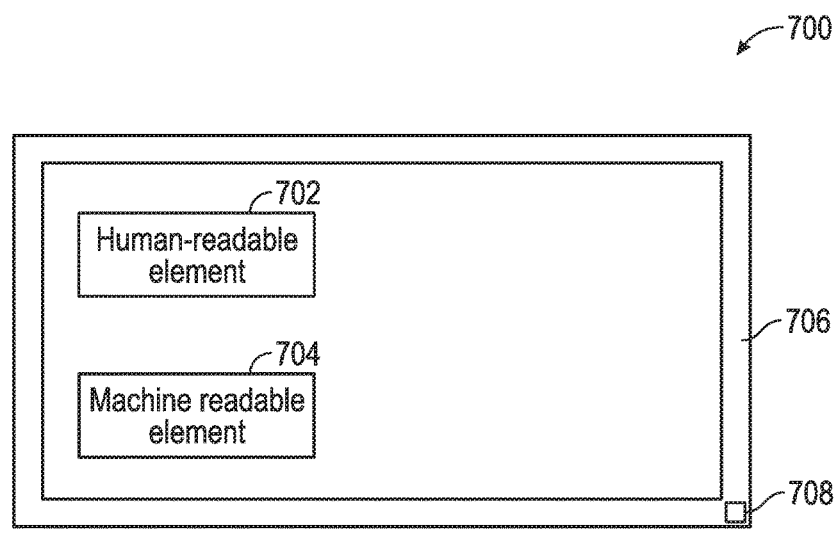
FIG. 7 is a block diagram of a code according to an embodiment of the present invention.

In some examples, data stored in the storage device 210 may be code data. Code data may include data for one or more codes, such as quick access codes (QACs). With reference to FIG. 7, a QAC may be a code, such as the quick access code 700, including one or more human-readable elements (e.g., human-readable element 702), such as text or a graphic, for providing information to an end user, one or more machine-readable elements (e.g., machine-readable element 704), such as a two-dimensional barcode, for providing information to a device, and one or more signaling elements (e.g., signaling element 706) for identifying the code. As will be described in further detail, the human-readable element of a QAC may describe (e.g., visually depict) a functionality of the QAC to the end user, and the machine-readable element of a QAC may include an identifier of a direct action which may be invoked to provide the described functionality. The machine-readable element may further include metadata that may be used to identify an entity associated with the code and/or determine whether a QAC has been scanned properly. In some examples, code data stored by the storage device 210 may further include data associated with the one or more codes stored in the storage device 210. By way of example, code data associated with a code may include instructions for invoking a direct action associated with the code.

Figure 3:
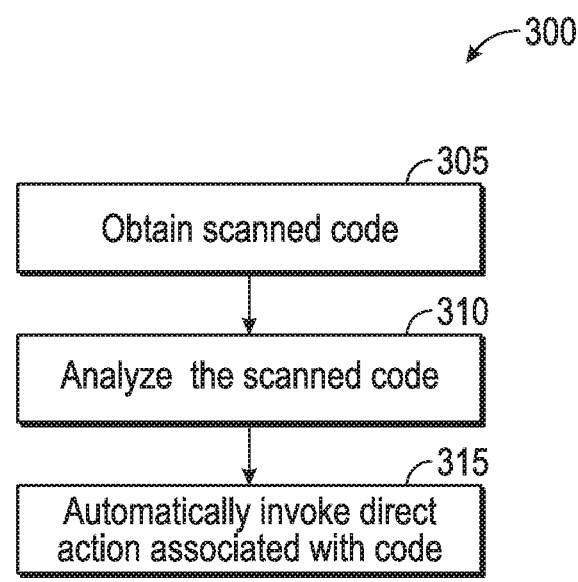
FIG. 3 is a flowchart of a process for invoking a direct action using an electronic device according to an embodiment of the present invention.

FIG. 3 is a flowchart of a process 300 for invoking a direct action using an electronic device according to an embodiment of the present invention. The process 300 may, for instance, be implemented using one or more components of the QAC system 100 and/or the QAC server system 200 of FIG. 2.

At a step 305, a client device 105 obtains a scanned code, such as a QAC. A scanned code may be obtained, for instance, in response to scanning a code using a scan application 104 of the client device 105. Codes may be scanned from printed or static media or an electronic display. In at least one embodiment, the scan application 104 may scan a code using a scanner (e.g., barcode reader) of the client device 105 or another device. In other embodiments, a code may be scanned by capturing an image of the code, for instance using a camera of the client device 105.

Once a scanned code has been obtained, at a step 310, the scan application 104 analyzes the code to identify a direct action associated with the scanned code. In some examples, analyzing the code may include identifying a machine-readable element of the code and analyzing the machine-readable element. Machine-readable elements may be identified (e.g., located), for instance, using one or more reference points (e.g., pixels) identifying a location and/or orientation of the machine-readable element relative to the code.

Once the machine-readable element has been identified, the scan application 104 may analyze the machine-readable element to identify a direct action associated with the code. Direct actions identified in this manner may be object-specific and/or may correspond to one more functions. By way of example, a direct action may correspond to one or more functions such that invoking the direct action results in invoking the one or more functions corresponding to the direct action. Briefly, analyzing the machine-readable element may include translating (e.g., decoding) the machine-readable element to identify the direct action associated with the machine-readable element. In some instances, the machine-readable element may further include other information, such as metadata. As an example, the machine-readable element may identify an entity associated with the code, such as a business at which the code is located or a user associated with the code. As another example, the machine-readable element may include a checksum and/or one or more error correction codes that may be used to determine whether a translation of the machine-readable element is accurate.

Machine-readable elements, as described, may include identifiers associated with respective direct actions corresponding to one or more respective functions, and accordingly, it will be appreciated by those skilled in the art that machine-readable elements taught herein may be advantageous over previously existing machine-readable elements. Briefly, previously known machine-readable elements merely include data, such as web addresses, and are as a result, limited in their use. By including an identifier of a direct action in lieu of, or in addition to, mere data, machine-readable elements as taught herein provide improved functionality and more intuitive use of codes.

In some examples, the scan application 104 may translate the machine-readable element into a string (e.g., of alphanumeric characters), and portions of the string may correspond to an identifier (e.g., identification number) of the direct action, an entity associated with the code, and/or a checksum, respectively. Strings provided in this manner may be of any length and/or structured in any format.

In some examples, the scan application 104 determines whether the direct action associated with the code is a priority direct action. Priority direct actions are direct actions whose instructions are stored locally on the client device 105, and may be direct actions commonly and/or recently invoked by devices of the end user and/or among a plurality of other users. Because instructions required to invoke a priority direct action are stored on the client device 105, a client device 105 may invoke a priority direct action without receiving further instructions. In some examples, the scan application 104 may determine whether a direct action is a priority direct action by comparing the identifier of the direct action against respective identifiers of each of the plurality of priority direct action stored on the client device 105. Additionally or alternatively, the scan application may compare direct actions using direct action names, checksums, associated entities, or any combination thereof.

Figure 5:
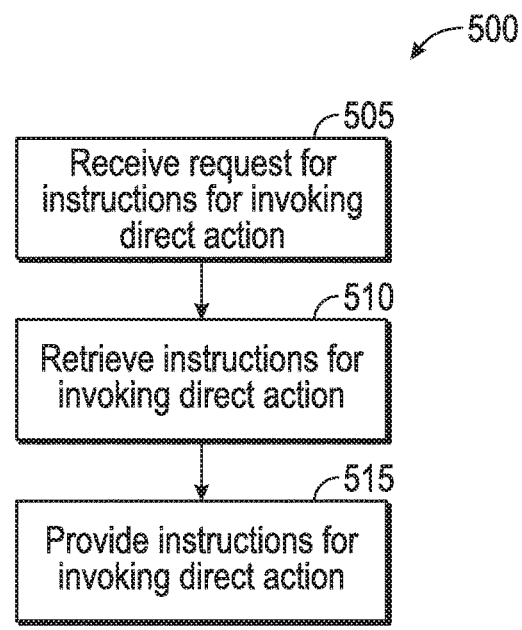
FIG. 5 is a flowchart of a process for providing instructions associated with a direct action according to an embodiment of the present invention.

If the direct action associated with the code is not a priority direct action, the scan application 104 retrieves instructions for invoking the direct action, for instance, from the QAC server system 103. With reference to FIG. 5, a process 500 for providing instructions associated with a direct action is described. In some examples, the process 500 may be implemented using the QAC engine 212 of the QAC server system 200 of FIG. 2. At a step 505, the QAC engine 212 may receive a request for instructions for invoking a direct action, for instance, from a scan application 104. The request may include the identifier of the direct action.

At a step 510, the QAC engine 212 retrieves instructions for invoking the function. By way of example, the QAC engine 212 may use the identifier to locate the instructions for invoking the direct action in one or more databases of the storage device 210. At a step 515, the QAC engine 212 provides the instructions to the scan application 104 of the client device 105.

Referring again to FIG. 3, at a step 315, the scan application 104 causes the client device 105 to automatically invoke the direct action associated with the scanned code. In this manner, the direct action may be invoked without any input from an end user and without performing any interstitial steps (e.g., accessing an interstitial web page) or diverting a function associated with the direct action to another service. As described, invoking a direct action may include invoking one or more functions of an application or service, for instance, on the client device 105 or on one or more other devices. The scan application 104 may invoke (e.g., perform) direct actions of applications or services stored on the client device 105, for instance, by calling one or more subroutines (e.g., executing instructions) of any number of applications, and/or the scan application 104 may invoke direct actions of applications or services residing on other devices, for instance, using application programming interface (API) calls or remote procedure calls (RPCs). Example direct actions include, but are not limited to:

initiating a phone call (e.g., using a phone number specified a code);
sending a message (e.g., SMS message, iMessage, MessageMe message)
sending an email (e.g., to an email address specified by a code);
adding a contact;
adding an event to a calendar of a client device;
adding an event to a third-party calendar service (e.g., Google Calendar)
mapping a location with a third-party mapping service (e.g., Google Maps);
adding a user on WhatsApp;
adding a user on Snapchat;
adding a user on WeChat;
"connecting" on LinkedIn;
"pinning" content on Pinterest;
"following" on Spotify;
"following" on Google Plus;
"following" on Instagram;
"following" on Twitter;
"following" on Facebook;
"liking" on Facebook;
adding an event on Facebook;
"checking-in" on Facebook;
"checking-in" on Foursquare;
streaming audio or video content (e.g., streaming content on Spotify, Soundcloud, YouTube, Deezer, Pandora, Beats, Vimeo, LoveLive)
downloading audio or video content;
purchasing goods or services (e.g., purchase using Amazon or eBay);
adding goods or services to a wish list;
rating a business or service;
voting in a poll (e.g., election);
responding to an invitation (e.g., accepting, declining, tentatively accepting);
registering for an event (e.g., entering a competition, reserving a table, making an appointment);
signing up for a distribution (e.g., newsletter, mailing list);
locating/tracking an object (e.g., luggage);
registering a warranty;
translating text;
downloading a portable document format (PDF) file;

connecting to or disconnecting from one or more networks (e.g., connect to free and/or public WiFi, connect to pay-to-use WiFi);

adjusting (e.g., silencing) ringer volume on a cellular phone; and downloading and/or installing an application.

In an example operation directed to a priority direct action, an end user may visit a business and wish to connect to the wireless network provided by the business. Accordingly, the end user may obtain a scanned code for connecting to the wireless network and in response, the scan application 104 may identify and analyze machine-readable element of the code identify a direct action associated with the code (recall that the machine-readable element includes an identifier that may be used to retrieve instructions of a priority direct action stored on the client device 105). The scan application 104 may use instructions associated with the direct action to automatically connect to the wireless network.

In an example operation directed to a non-priority direct action, an end user may visit a business and wish to enter a competition (e.g., raffle) offered by the business. Accordingly, the end user may obtain a scanned code for entering the competition and in response, the scan application 104 may identify and analyze a machine-readable element of the code to identify the direct action of the code (recall that the machine-readable element includes an identifier that may be used to retrieve instructions of a non-priority direct action from the QAC server system 103). The scan application 104 may retrieve the appropriate instructions for invoking the direct action and use the instructions to automatically enter the end user in the competition.

In some examples where a scan application retrieves instructions from the QAC server system 103, the scan application 104 may store the instructions on the client device 105 for further use and/or add the direct action to a list of priority direct actions. In this manner, a scan application 104 may reduce a number of requests for instructions from the QAC server 103.

In some examples, a code may be associated with multiple direct actions, each of which may be identified by a scan application 104. Accordingly, the scan application 104 may retrieve instructions for and/or invoke each of the direct actions sequentially, or may retrieve instructions for and/or invoke each of the direct actions concurrently, simultaneously, or in an otherwise overlapping manner. Whether direct actions are invoked sequentially or simultaneously may be indicated by a code. The scan application 104 may present one or more of the multiple direct actions to an end user, allowing the end user to select which of the direct actions are invoked by the scan application 104.

In some examples, the scan application 104 may be invoked by one or more other applications. Applications invoking the scan application may further specify whether obtaining scanned codes, for instance with the scan application 104, is restricted to one or more types of codes and further may specify whether an end user should be returned to an application once a scanned code has been analyzed. In other examples, one or more other applications may embed a scan module such that the applications are configured to obtain scanned codes in accordance with examples described herein.

As described with respect to the process 300, if a direct action is not a priority direct action, the scan application 104 may retrieve instructions for invoking the direct action from the QAC server system 103. In some instances, however, data network communication may be unavailable such that the scan application 104 cannot retrieve additional instructions or properly invoke a direct action requiring data network communication.

Figure 4:
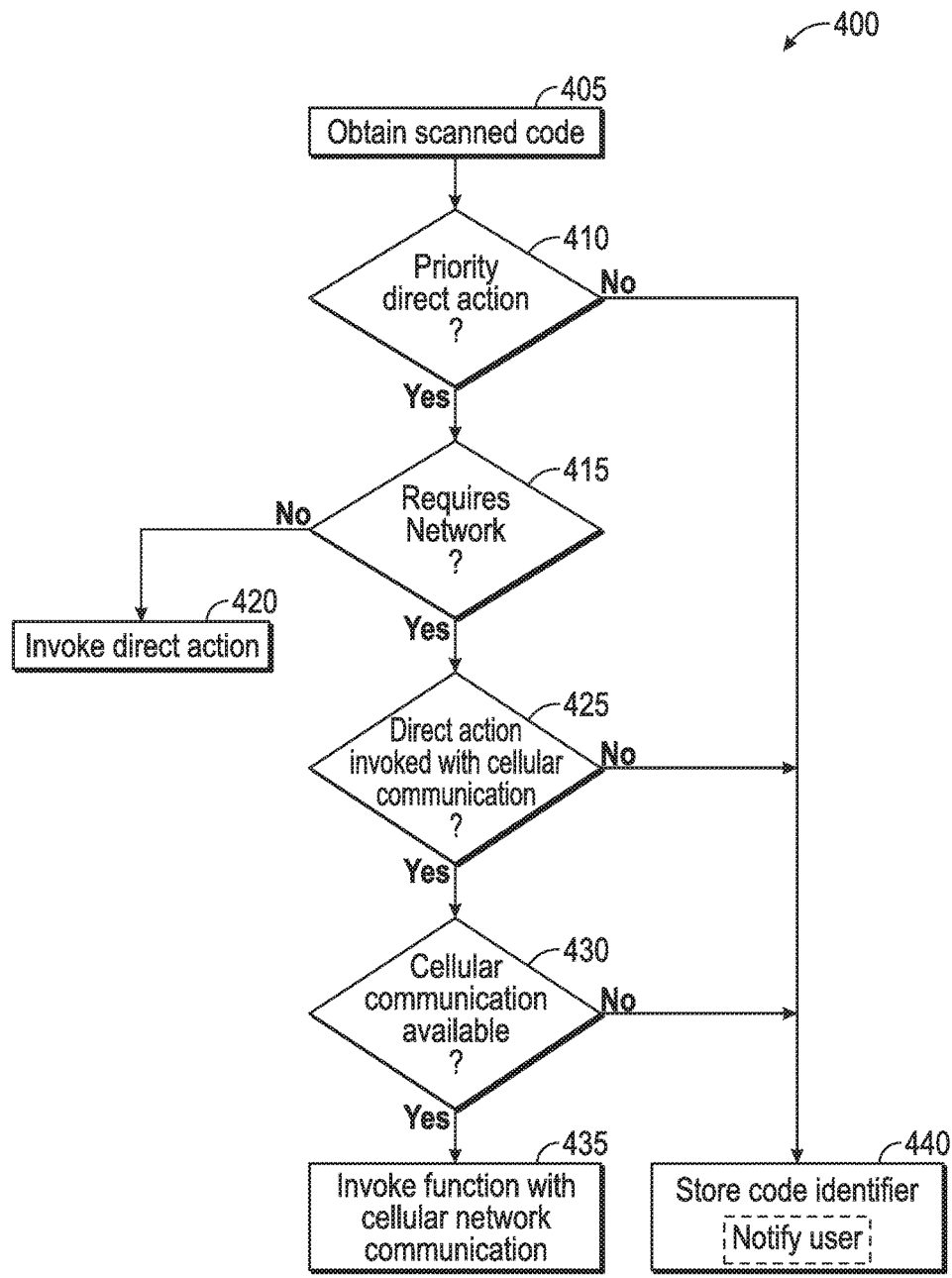
FIG. 4 s a flowchart of a process for invoking a direct action when data network communication is not available according to an embodiment of the present invention.

FIG. 4 s a flowchart of a process 400 for invoking a direct action when data network communication is not available according to an embodiment of the present invention. The process 400 may, for instance, be implemented using one or more components of the QAC system 100 and/or the QAC engine 212 of the QAC server system 200 of FIG. 2.

At a step 405, an end user may obtain a scanned code and identify a direct action associated with the code. For example, as described with reference to step 305 of FIG. 3, a scan application 104 may identify a machine-readable element of the code and analyze the machine-readable element to identify the direct action associated with the code. At a step 410, the scan application 104 determines whether the direct action is a priority direct action. In some examples, this determination includes comparing an identifier of the code with identifiers of one or more direct actions stored locally on the client device 105.

If the scan application 104 determines that the direct action is not a priority direct action, because data network communication is unavailable, the scan application 104 stores the identifier of the code on the client device 105 at a step 440. The scan application 104 further may optionally notify the end user that the identifier was stored. When the client device 105 subsequently reestablishes data network communication, the scan application 104 may retrieve instructions for invoking the direct action using the identifier and invoke the direct action, as described with respect to steps 315 and 320 of FIG. 3, respectively.

If the scan application 104 determines that the direct action is a priority direct action, the scan application 104 determines whether network communication is required to invoke the direct action at a step 415. For example, the scan application 104 may determine whether invoking the direct action includes invoking only functions of applications stored on the client device 105, or if invoking the direct action includes invoking one or more functions of applications residing on one or more other devices.

If the scan application 104 determines that network communication is not required to invoke the direct action, the scan application invokes the direct action at a step 420. If the scan application 104 determines that network communication is required to invoke the direct action, the scan application 104 determines whether the direct action can be performed using cellular network communication at a step 425. In some examples, determining whether a direct action can be invoked using cellular network communication includes determining whether the direct action can be invoked by initiating a phone call or sending a message (e.g., SMS message) over a cellular network. As an example, a direct action associated with a poll may allow an end user to register a vote in the poll using an SMS message.

If the scan application 104 determines that the direct action cannot be invoked using cellular network communication, at the step 440, the scan application 104 stores the identifier and optionally notifies the end user that the identifier has been stored, as described. If the application determines that the direct action can be invoked using cellular network communication, the scan application 104 determines whether cellular network communication is available at a step 430. If cellular network communication is not available, the scan application stores the identifier and optionally notifies the end user that the identifier has been stored at the step 440. If cellular network communication is available, the scan application 104 invokes the direct action using cellular network communication at a step 435.

In some examples, a user may interface with the QAC engine 212 to provide (e.g., generate), manage, and/or configure one or more codes. Briefly, a user may establish a user account and generate one or more codes that may be associated with the account. Thereafter, the user may access the user account to modify or delete the codes.

Figure 6:
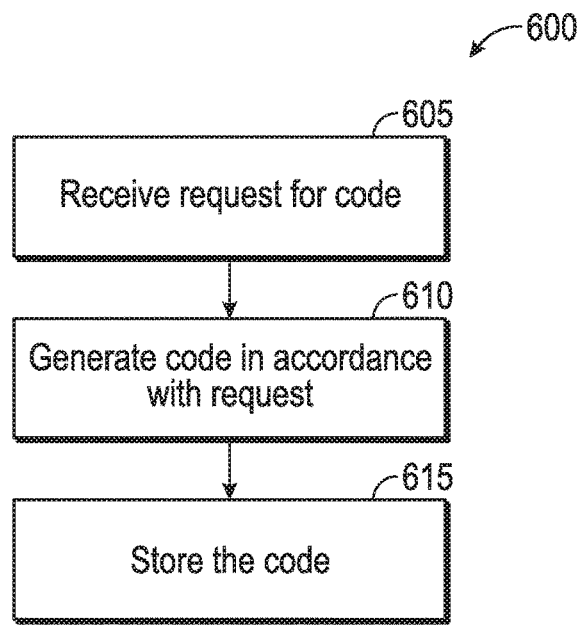
FIG. 6 is a flowchart of a process for providing a code according to an embodiment of the present invention.

FIG. 6 is a flowchart of a process 600 for providing a code according to an embodiment of the present invention. The process 600 may be performed using one or more of the QAC engine 212. At a step 605, the QAC engine 212 may receive a request for a code. The request may be received from a client device 105 and may, for instance, be received after authenticating an end user of the client device 105 with a user account.

The request may include an indication of one or more direct actions to be associated with the code. For example, the request may indicate a direct action for "liking" a page on Facebook. The request further may include an indication that the code is to include one or more features. Such features include graphics, text, schemes (e.g., color scheme, pattern scheme), designs, and one or more types of metadata. In one example, a user may identify a particular phrase to be included in the code as text. In another example, a user may indicate that a signaling element (e.g., frame) of the code is to have a substantially square shape and include at least a portion of the machine-readable element of the code. In yet another example, a user may indicate that the machine-readable element of the code is to include an indication of an entity (e.g., user) associated with the code. In some examples, the user may provide a request for a code using a web-based interface or a scan application, such as a scan application 104. Accordingly, users may interface with the QAC engine 212 using any web-capable device or any other device configured to support a web browser or the scan application 104.

Once a request for a code has been received, at a step 610, the QAC engine 212 may generate the code in accordance with the request provided at the step 605. The QAC engine 212 may generate a code such that the machine-readable element includes an identifier of the code and further includes any particular features identified in the request. The identifier may be chosen randomly in some examples. Once the code has been generated, the code may be provided to the client device 105, for instance, by displaying the code on a display of the client device 105. Additionally or alternatively, the QAC engine 212 may provide the code to a user of the client device 105 (the user associated with the authenticated user account) in a file format (e.g., bitmap, JPEG, PDF) via an email or SMS message.

At a step 615, the QAC engine 212 may store the code provided at the step 610. The code may be stored in the storage device 210, and in particular may be stored in one or more databases of the storage device 210. The QAC engine 212 may further store instructions for invoking a direct action (e.g., invoking one or more functions corresponding to the direct action) associated with the code and/or categorize the code as one or more code types. A code may, for instance, be categorized as a "free," "freemium," or "premium" code.

In addition to codes and instructions for invoking direct actions associated with codes, user data may be stored in the storage device 210. The user data may include a profile for each of any number of users describing one or more actions taken by users. A profile may, for instance, specify any interactions of an end user with a social media platform and/or an address used for a delivery. A profile further may specify any scanned codes obtained by an end user, direct actions invoked in response to obtaining the scanned codes, locations at which the scanned codes were obtained, and times at which the scanned codes were obtained. User data may include data provided to the QAC engine 212 from one or more scan applications and data included in one or more user accounts.

In some examples, user data, including profiles, may be analyzed by the QAC engine 212 or by a third-party analytics service (e.g., Google Analytics). User data may be analyzed, for instance, to track the number of times a code is scanned, times at which a code is scanned, a frequency at which a code is scanned, and/or any demographic information about end users that have scanned the code.

In some examples, a user may modify or delete an existing code associated with a user account. A user may change a direct action associated with a code. In response, the QAC engine 212 may update the instructions associated with the direct action such that invoking the direct action on a client device 105 thereafter results in invoking the direct action using the updated instructions. In some examples, updating in this manner may result in updating the one or more functions corresponding to the direct action. In this manner, association of a code and a direct action may be dynamic. In one example, a direct action for initiating a phone call may be updated. A user may, for instance, update the phone number associated with the direct action in the event that a user prefers invoking the direct action associated with the code result in a device calling the updated number. In another example, a user may disable a code such that no direct action is associated with the code.

In some examples, a user may associate multiple direct actions with a code. Accordingly, multiple sets of instructions may be associated with a code, and in response to a request for instructions associated with the code, the QAC engine 212 may provide one or more sets of the instructions. The one or more sets of instructions provided by the QAC engine 212 may be based on one or more characteristics of the code and/or a client device 105. In one example, which instructions are returned (which direct action a device will perform) is based on a type of the client device 105. A client device comprising a tablet may receive a first set of instructions, a client device comprising a mobile phone may receive a second set of instructions, and camera-enabled glasses (e.g., Google glass) may receive a third set of instructions. In another example, which instructions are returned is based on a time of a scan. A direct action to download a particular video, for instance as part of a promotion, may only be available during a particular period of time (e.g., 2 p.m. to 3 p.m.), or similarly, may only be free to an end user during a period of time and otherwise require payment. In yet another example, which instructions are returned is based on a location of a scan. As part of a treasure hunt, codes may be assigned different direct actions based on the location of the codes. In this manner, a promotion for the treasure hunt may be advertised in multiple locations, with a single location awarding a prize and other locations providing clues. In yet another example, which instructions are provided is based on a direction in which a scan takes place. Obtaining a scanned code while facing north may result in a device receiving a first set of instructions (and invoking a first direct action), and obtaining a scanned code while facing south may result in a device receiving a second set of instructions (and invoking a second direct action). In yet another example, which instructions are returned is based on a form or shape of a signaling element (FIG. 7) of the code. Scanning a square signaling element may result in a device receiving a first set of instructions (and invoking a first direct action), and scanning a signaling element may result in a device receiving a second set of instructions (and invoking a second direct action). In yet another example, a machine-readable element may comprise a three-dimensional barcode, and which instructions are returned is based on the angle of a scanned code (e.g., at which the code is scanned). In other examples, which instructions are returned is based on ambient temperature, heart rate of an end user, speed of travel of an end user, altitude, presence or proximity of one or more other end users, proximity of the client device 105 to one or more other devices, or any combination or sub-combination thereof.

As described, in instances in which a direct action is determined to be a priority direct action, a scan application may cause a device to invoke a direct action without receiving further instructions. However, because in some instances the direct action associated with a code may be updated, in some examples the scan application may determine (e.g., periodically) whether one or more priority direct actions are associated with current instructions or whether one or more updates are necessary.

In some examples, prior to storing the code at the step 615, the QAC engine 212 may compare the code to one or more other codes stored in the storage device 210. If the code is not sufficiently different than the other codes, the QAC engine 212 may inform the user that one or more parameters of the code must be adjusted to satisfy a threshold amount of contrast and allow storage of the code in the storage device 210. For example, a user may be required to change a graphic of the code due to similarity to one or more other codes.

FIG. 7 is a block diagram of a quick access code (QAC) 700 according to an embodiment of the present invention. The quick access code 700 may include a human-readable element 702, a machine-readable element 704, and a signaling element 706.

The human-readable element 702 of the QAC 700 may comprise any text, graphic, or other visual object that provides information to an end user. Accordingly, the human-readable element 702 may allow an end user to readily determine that he or she is viewing a code and/or determine the direct action included in the machine-readable element 704.

The machine-readable element 704 may be any known machine-readable representation of data, such as a barcode (e.g., 2D or 3D barcode) or waveform (e.g., processing waveform) that provides information to a device in response to being scanned and/or analyzed. In some examples, the machine-readable element 704 may be scanned using a scan application, such as the scan application 104 of FIG. 1, and the scan application may identify and invoke direct actions associated with the code automatically. Herein, invoking direct actions automatically includes invoking direct actions associated with a code without invoking (e.g., (performing) an interstitial step (e.g., accessing an interstitial web page) or diverting a function to a particular service. As described, direct actions may be invoked on the client device 105 and/or any number of other devices. In some examples, the machine-readable element may provide metadata about the code. The metadata may, for instance, specify an entity associated with the code and/or one or more data error checking mechanisms, such as a checksum.

In some examples, the machine-readable element 704 may include one or more mechanisms for identifying a location of the machine-readable element 704 within the quick access code 700. By way of example, the machine-readable element 704 may include one or more reference pixels that may be used by a scan application to identify (e.g., locate) a boundary of a machine-readable element 704.

The signaling element 706 is used by a scan application to identify a code. The scan application may identify the signaling element 706, for instance, based on a shape and/or orientation of the signaling element 706, and in response, identify a location of the machine-readable element 704, as described. The signaling element 706 may include an orientation element 708 that, in some examples, may render a design of the signaling element 706 unique such that the signaling element 706 is recognizable by the scan application. Additionally or alternatively, the orientation element 708 further may render the shape of the signaling element 706 vertically and/or horizontally asymmetric such that the quick access code 700 may be scanned with a correct orientation. In some examples, the signaling element 706 may circumscribe one or more of a portion of the human-readable element 702 or a portion of the machine-readable element 704. The signaling element 706 further may have parallel sides, or any other specified shape, to allow the scan application to scan the code with correction for perspective when the code is scanned at an angle.

As illustrated, the signaling element 706 may be implemented as a frame separate from the human-readable element 702 and the machine-readable element 704. It will be appreciated, however, that the signaling element 706 may include one or more of the human-readable element 702 or machine-readable element 704, or may be separate from a code (e.g., adjacent to code). The signaling element 706 may include a portion or the entirety of a human-readable element 702 or a machine-readable element 704. In one example, a portion of a machine-readable element 704 may be included in the signaling element 706 and a portion of the machine-readable element 704 may be separate from the signaling element 706. The multiple portions of the machine-readable element 704 may be associated with a same direct action, or each portion of the machine-readable element may be associated with a respective direct action. As an example, a first portion may be associated with playback of a video and a second portion may be associated with playback of audio for playback during playback of the video.

In some examples, a scan application may periodically access a camera application of a client device to determine whether a code may be scanned. In some examples, the scan application may determine whether a code may be scanned based on whether an image provided by the camera application includes a signaling element. In other examples, a scan application may determine whether a code may be scanned based on whether an image provided by the camera application includes a machine-readable element.

The quick access code 700 may be implemented using any number of colors and/or schemes. The machine-readable element 704 may for instance, be black and white while the human-readable element 702 and/or the signaling element 706 may be implemented in red (e.g., to attract attention). In some examples, colors of one or more portions of the quick access code 700 may be inverted without altering information included (e.g., encoded) in the machine-readable element 704. For example, in a first instance, the quick access code 700 may be implemented on a black background and the machine-readable element 704 may be implemented as a white-on-black machine-readable element, and in a second instance, the quick access code 700 may be implemented on a white background and the machine-readable element 704 may be implemented as a black-on-white machine-readable element.

FIGS. 8A-8J illustrate codes 800-890 according to one or more embodiments of the present invention. FIGS. 8A-8E illustrate codes 800-840, respectively, according to embodiments of the present invention. Each of the codes 800-840 includes a respective human-readable element 802-842, machine-readable element 804-844, and signaling element 806-846. Each signaling element 806-846 may include an orientation element 808-848.

Figure 8A:
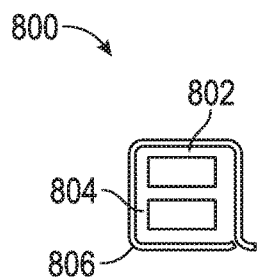
FIGS. 8A-8L illustrate codes according to one or more embodiments of the present invention.
Figure 8B:
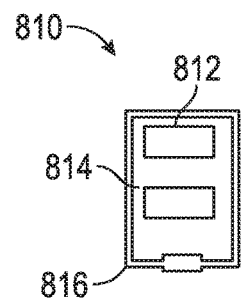
Figure 8C:
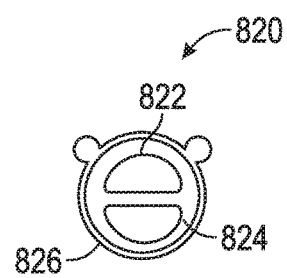
Figure 8D:
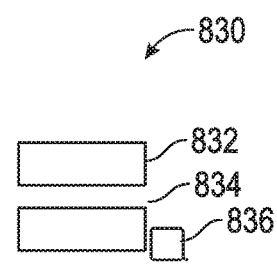
Figure 8E:
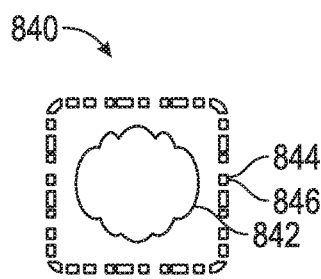

As shown in FIGS. 8A-8C, in some example codes, one or more of a human-readable element and a machine-readable element may be circumscribed by a signaling element, and as shown in FIG. 8D, in other example codes, both a human-readable element and a machine-readable element may not be circumscribed by a signaling element. It will be appreciated that in other examples, one or more of a human-readable element or a machine-readable element may be partially circumscribed and/or located outside of a signaling element. In yet other example codes, a signaling element may comprise one or more of a human-readable element or a machine-readable element. The code 840 of FIG. 8E, for instance, includes a signaling element 846 that comprises the machine-readable element 844.

Generally, signaling elements may have any size, shape or pattern. Some example signaling elements, such as those illustrated in FIGS. 8A-8B and 8D-8E, have a substantially square or rectangular shape, and may include an orientation element as described. Other example signaling elements, such as the code 820 illustrated in FIG. 8C, have a substantially circular shape, and may include an orientation element 826. In yet other example codes, a signaling element may have a substantially triangular shape or any other geometric shape, and may include an orientation element having any geometric shape or may not include an orientation element.

Figure 8F:
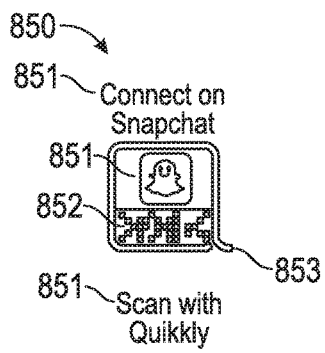
Figure 8G:
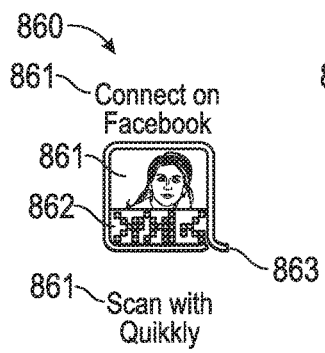
Figure 8H:
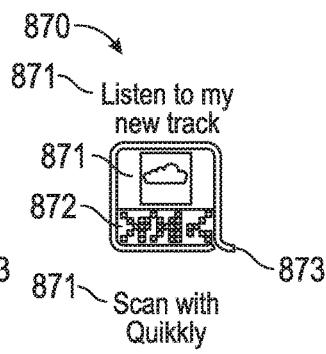
Figure 8I:
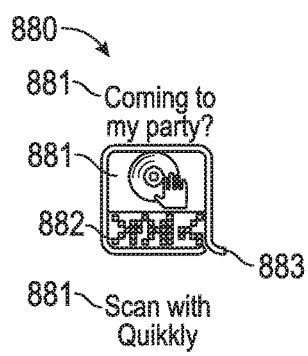
Figure 8J:
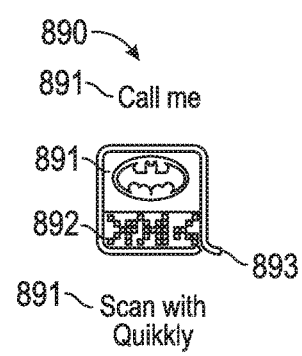

FIGS. 8F-8H illustrate exemplary codes 850-890 that may, for example, be used to implement the code 800 of FIG. 8A. As illustrated, each of the codes 850-890 may include a respective human-readable element 851-891 that may be used to provide information to the end user. By way of example, the human-readable element 851 of the code 850 may include an image associated with a social media platform Snapchat to indicate to an end user that the code 850 is directed to one or more direct actions associated with the social media platform Snapchat. The human-readable element 851 may further include text indicating to the end user that scanning the code 800 will result in invoking a "connecting" direct action of a Snapchat application directed to an entity (e.g., a particular Snapchat user) associated with the code. The human-readable element 851 further instructs the end user to scan the code, for instance, using a scan application 104. As illustrated, a first portion of a human-readable element 851 may be located outside of a signaling element 853, and a second portion of the human-readable element 851 may be located within the signaling element 853. It will be appreciated by those having skill in the art that in some examples, the human-readable element 851 may be located entirely within or outside of the signaling element 853, or may be omitted. Each of the codes 850-890 further includes a machine-readable element 852-892 that may be used to provide information to a device. By way of example, the machine-readable element 852 of the code 850 may comprise a 2-dimensional barcode that may be analyzed by a scan application, such as the scan application 104 of FIG. 1. The machine-readable element 854 may include an identifier of a direct action, such as a direct action for connecting the end user with a particular Snapchat user as indicated by human-readable element 851.

Figure 8K:
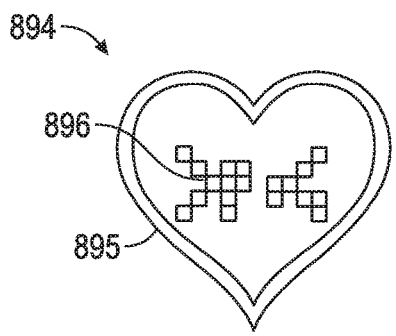
Figure 8L:
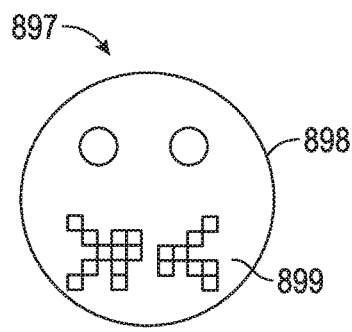

FIGS. 8K-8L illustrate exemplary codes 894-897, respectively, according to embodiments of the present invention. Each of the codes 894-897 includes a respective human-readable element 895-898 and a machine-readable element 896-899. As illustrated, each of the human-readable elements 8002-8012 may be implemented using a graphic representation to convey a particular or emotion to an end user. In some examples, each of the human-readable elements 895-898 may further operate as a signaling element. The machine-readable elements 896-899 may operate in accordance with examples described herein and will not be discussed further in the interest of brevity.

Figure 9:
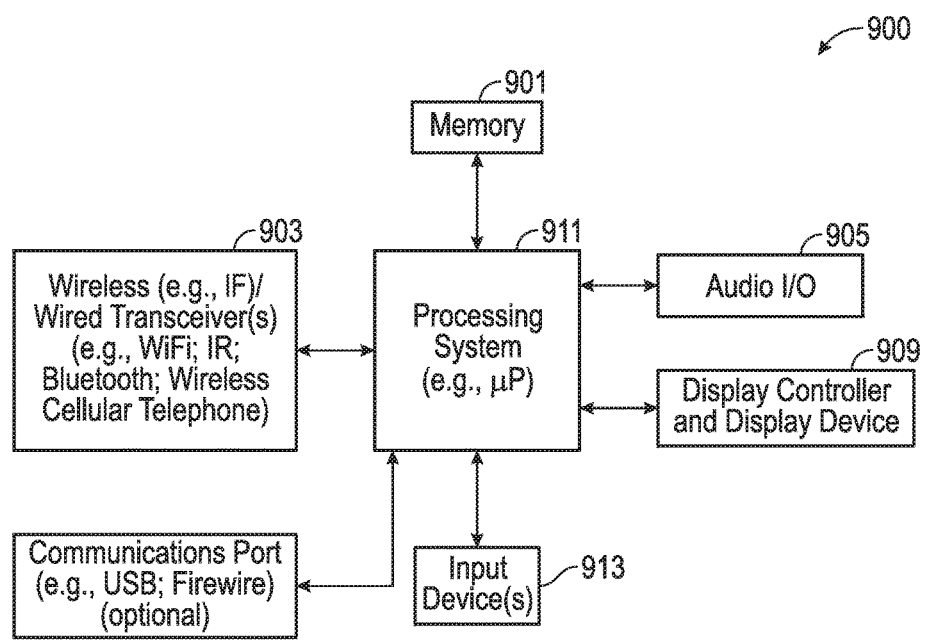
FIG. 9 is a block diagram of data processing system according to an embodiment of the present invention.

FIG. 9 illustrates a data processing system 900 according to an embodiment of the present invention. One or more clients, such as client devices 105 of FIG. 1, and/or one or more server systems, such as the QAC server system 103 of FIG. 1, may be implemented using the data processing system 900. The data processing system 900 shown in FIG. 9 includes a processing system 911, which may include one or more microprocessors and/or a system on a chip (integrated circuit). The data processing system 900 further may include memory 901 for storing data and programs for execution by the processing system 911. The memory 901 can store, for example, the software components described in conjunction with FIG. 1 and can be any known form of a machine readable non-transitory storage medium, such as semiconductor memory (e.g., flash; DRAM; SRAM; PCM; etc.). The data processing system 900 may also include an audio input/output subsystem 905 which includes a microphone and/a speaker for music playback and/or for providing telephone functionality.

The data processing system 900 may include a display controller and display device 909 that can provide a visual user interface for a user. In some examples, this interface may include a graphical user interface (GUI). The data processing system 900 may also include one or more wireless transceivers 903 to communicate with one or more other data processing systems. A wireless transceiver 903 may be a WLAN transceiver (e.g. WiFi), an infrared transceiver, a Bluetooth transceiver, and/or a wireless cellular telephony transceiver. The data processing system 900 further can include one or more communications ports 917 to communicate with another data processing system. The communications port 917 may be a USB port, Firewire port, Bluetooth interface, a docking port, or any other communications port known in the art.

In some examples, the data processing system 900 includes one or more input devices 913 configured to receive input from a user. These input devices 913 may include a pointing device (e.g., mouse), keypad, keyboard, touch panel, and/or multi-touch panel overlaid and integrated with a display device, such as a display device 909. The data processing system 900 can also include an optional input/output device which may be a connector for a dock. It will be appreciated that one or more buses, not shown, may be used to interconnect the various components of the data processing system 900 as is well known in the art. It will be appreciated that in some examples one or more additional components (not shown in FIG. 9) may also be part of the data processing system 900, and that in some examples one or more components shown in FIG. 9 may be omitted from the data processing system 900.

In some examples, the data processing system 900 shown in FIG. 9 may be a handheld computer, a personal digital assistant (PDA), a cellular telephone with PDA-like functionality, a handheld computer which includes a cellular telephone, a media player, a game or entertainment device, and/or any combination or sub-combination of the same (e.g., a media player combined with a PDA and a cellular telephone, an embedded device, or other consumer electronic devices). In other embodiments, the data processing system 900 may be a network computer or an embedded processing device configured to operate with one or more other devices, or other types of data processing systems which have fewer or more components than those shown in FIG. 9.

Although only certain exemplary embodiments have been described in detail above, those skilled in the art will readily appreciate that many modifications are possible in the exemplary embodiments without materially departing from the novel teachings and advantages of these techniques. For example, aspects of embodiments disclosed above can be combined in other combinations to form additional embodiments. Similarly, aspects of embodiments disclosed above can be excluded. Accordingly, all such modifications are intended to be included within the scope of this disclosure.

The invention claimed is:

1. A non-transitory computer-readable storage medium storing one or more programs, the one or more programs comprising instructions that, when executed by one or more processors of a first computing device, cause the first computing device to:
   receive a scanned code including:
      a human-readable element;
      a machine-readable element including an identifier of a direct action, and
      a signaling element;
   analyze the scanned code to identify the direct action associated with the scanned code, the direct action corresponding to one or more functions on one or more of the first computing device and a second computing device;
   determine that the direct action is not a priority direct action of a set of priority direct actions, the set of priority direct actions being stored on the first computing device;
   retrieve, from the second computing device, instructions for invoking the one or more functions; and
   automatically invoke the one or more functions corresponding to the direct action on one or more of the first computing device and the second computing device.

2. The non-transitory computer-readable storage medium of claim 1 wherein the machine-readable element defines a shape in the scanned code and the shape functions as the signaling element.

3. The non-transitory computer-readable storage medium of claim 1 wherein the signaling element defines a first shape in the scanned code, and the one or more programs include further instructions causing the first computing device to:
   identify a location of the machine-readable element based on the first shape.

4. The non-transitory computer-readable storage medium of claim 1 wherein the scanned code includes one or more reference points, and the one or more programs include further instructions causing the first computing device to:
   identify a location of the machine-readable element based on the one or more reference points.

5. The non-transitory computer-readable storage medium of claim 1 wherein the machine-readable element includes a waveform.

6. A non-transitory computer-readable storage medium storing one or more programs, the one or more programs comprising instructions that, when executed by one or more processors of a first computing device, cause the first computing device to:
   receive a scanned code including:
      a human-readable element;
      a machine-readable element including an identifier of a direct action, and
      a signaling element,
   wherein the human-readable element or the signaling element includes an indicator of an application or service;
   analyze the scanned code to identify the direct action associated with the scanned code, the direct action corresponding to one or more functions of the application or service,
   obtain, from the storage medium of the first computing device, instructions for invoking the direct action, and
   automatically invoke the direct action.

7. The non-transitory computer-readable storage medium of claim 6 wherein the human-readable element is surrounded by the signaling element.

8. The non-transitory computer-readable storage medium of claim 7 wherein the human-readable element includes an image.

9. The non-transitory computer-readable storage medium of claim 6 wherein the human-readable element is surrounded by the machine-readable element.

10. The non-transitory computer-readable storage medium of claim 6 wherein the signaling element defines a first area, and the machine-readable element is located outside of the first area.

11. The non-transitory computer-readable storage medium of claim 6 wherein the human-readable element and the signaling element are each all or part of the same element.

12. The non-transitory computer-readable storage medium of claim 6 wherein the direct action begins a process for associating a first user account of the application or service with a second user account of the application or service.

13. The non-transitory computer-readable storage medium of claim 6 wherein the human-readable element includes an image of a user.

14. The non-transitory computer-readable storage medium of claim 6 wherein the one or more programs include further instructions causing the first computing device to:
   determine that additional information is needed, wherein the information includes data or additional instructions for invoking the direct action, and
   retrieve, from a second computing device, the additional information;
   wherein the direct action is automatically invoked after the additional information is retrieved from the second computing device.

15. The non-transitory computer-readable storage medium of claim 6 wherein the application or service is on a second computing device.

16. A non-transitory computer-readable storage medium storing one or more programs, the one or more programs comprising instructions that, when executed by one or more processors of a first computing device, cause the first computing device to:
   receive a scanned code including:
      a human-readable element;
      a machine-readable element including an identifier of a first direct action, and a signaling element;

analyze the scanned code to identify the first direct action associated with the scanned code, the first direct action corresponding to one or more functions of an application or a service on one or more of the first computing device and a second computing device;

obtain, from the storage medium of the first computing device, first instructions for invoking the first direct action, the first instructions including instructions to send, to a second computing device, information related to the first direct action, wherein the information includes at least one of second instructions and data; and automatically invoke the first direct action on one or more of the first computing device and the second computing device.

17. The non-transitory computer-readable storage medium of claim 16 wherein the information includes second instructions, the second instructions causing the second computing device to automatically invoke a second direct action.

18. The non-transitory computer-readable storage medium of claim 16 wherein the human-readable element or the signaling element includes an identifier of the application or the service.

19. The non-transitory computer-readable storage medium of claim 16 wherein the human-readable element is surrounded by the signaling element.

20. The non-transitory computer-readable storage medium of claim 16 wherein the human-readable element includes an image.

21. The non-transitory computer-readable storage medium of claim 20 wherein the machine-readable element is located between the image and at least part of the signaling element.

22. The non-transitory computer-readable storage medium of claim 16 wherein the human-readable element is surrounded by the machine-readable element.

23. The non-transitory computer-readable storage medium of claim 16 wherein the signaling element defines a first area, and the machine-readable element is located outside of the first area.

24. The non-transitory computer-readable storage medium of claim 16 wherein the human-readable element and the signaling element are each all or part of the same element.

25. The non-transitory computer-readable storage medium of claim 16 wherein the first direct action begins a process for associating a first user account of the application or service with a second user account of the application or service.

26. The non-transitory computer-readable storage medium of claim 16 wherein the human-readable element includes an image of a user.

27. A non-transitory computer-readable storage medium storing one or more programs, the one or more programs comprising instructions that, when executed by one or more processors of a computing device, cause the computing device to:

decode a code in an image, the code including:
(i) a human-readable element associated with a first direct action, the first direct action associated with connecting a first user account associated with the image to a second user account associated with the computing device, and
(ii) a machine-readable element including an encoded identifier corresponding to the first user account, to obtain a decoded identifier;

send the decoded identifier to a server, the server:
(i) accessing a database containing information associated with the decoded identifier,
(ii) identifying the first user account based on the decoded identifier, and
(iii) retrieving information associated with the first user account from the database;

receive from the server the retrieved information; and invoke the first direct action on the computing device using the received retrieved information.

28. The non-transitory computer-readable storage medium of claim 27 wherein the server further retrieves instructions associated with the information associated with the first user account, wherein the computing device receives from the server the retrieved instructions, and wherein the computing device invokes the first direct action on the computing device using the received retrieved information and instructions.

29. The non-transitory computer-readable storage medium of claim 27 wherein the first direct action begins a process for associating the first user account with the second user account.

30. The non-transitory computer-readable storage medium of claim 27 wherein the human-readable element is also associated with a second direct action.

31. The non-transitory computer-readable storage medium of claim 27 wherein the first direct action is also associated with at least one of: streaming audio content, streaming video content, downloading audio content, downloading video content, and following the second user account.

32. A non-transitory computer-readable storage medium storing one or more programs, the one or more programs comprising instructions that, when executed by one or more processors of a computing device, cause the computing device to:

detect a code in an image, the code including:
(i) a human-readable element, and
(ii) a machine-readable element, the machine-readable element including an encoded identifier corresponding to a first user account;

decode the encoded identifier;

send the decoded identifier to a server, the server:
(i) accessing a database containing information associated with the decoded identifier,
(ii) identifying the first user account based on the decoded identifier,
(iii) identifying a first direct action based on the decoded identifier, the first direct action associated with connecting the first user account to a second user account associated with the computing device;
(iv) retrieving information associated with the first user account from the database, and
(v) retrieving instructions associated with the first direct action from the database;

receive, from the server, the retrieved information and instructions; and invoke the first direct action on the computing device using the received retrieved information and instructions.

33. The non-transitory computer-readable storage medium of claim 32 wherein the first direct action begins a process for associating the first user account with the second user account.

34. The non-transitory computer-readable storage medium of claim 32 wherein the human-readable element is associated with the first direct action and a second direct action.

35. The non-transitory computer-readable storage medium of claim 32 wherein the first direct action is also associated with at least one of: streaming audio content, streaming video content, downloading audio content, downloading video content, and following the second user account.

36. A non-transitory computer-readable storage medium storing one or more programs, the one or more programs comprising instructions that, when executed by one or more processors of a first computing device, cause the first computing device to:
  decode a code in an image, the code including:
    (i) a human-readable element associated with a first direct action, the first direct action associated with connecting the first computing device to a second computing device, and
    (ii) a machine-readable element including an encoded information corresponding to the second computing device,
  to obtain a decoded information; and
  invoke the first direct action on the first computing device using the decoded information.

37. The non-transitory computer-readable storage medium of claim 36 wherein the first computing device includes camera-enabled glasses and the second computing device includes a mobile device.

38. The non-transitory computer-readable storage medium of claim 1 wherein the direct action is associated with at least one of: streaming audio content, streaming video content, downloading audio content, downloading video content, following the second user account, and signing up for a distribution.

39. The non-transitory computer-readable storage medium of claim 6 wherein the direct action is also associated with at least one of: streaming audio content, streaming video content, downloading audio content, downloading video content, following the second user account, and signing up for a distribution.

40. The non-transitory computer-readable storage medium of claim 16 wherein the first direct action is also associated with at least one of: streaming audio content, streaming video content, downloading audio content, downloading video content, following the second user account, and signing up for a distribution.

* * * * *